US006540261B1

(12) United States Patent
Painter et al.

(10) Patent No.: US 6,540,261 B1
(45) Date of Patent: Apr. 1, 2003

(54) FIRE SPRINKLER PIPING SYSTEM FITTING

(75) Inventors: Robert W. Painter, Trinity, AL (US); Stephen J. Meyer, Malvern, PA (US); Carmine L. Schiavone, Schwenksville, PA (US); Michael W. Whited, Huntsville, AL (US); Victor C. Weigand, III, Pottstown, PA (US); Kevin W. Pressnell, Athens, AL (US)

(73) Assignee: Central Sprinkler Company, Lansdale, PA (US)

( * ) Notice: Subject to any disclaimer, the term of this patent is extended or adjusted under 35 U.S.C. 154(b) by 0 days.

(21) Appl. No.: 09/724,167

(22) Filed: Nov. 28, 2000

(51) Int. Cl.$^7$ ............................ F16L 41/00; A62C 35/00
(52) U.S. Cl. ................ 285/133.11; 285/133.4; 285/133.5; 169/5; 169/37
(58) Field of Search ............................ 285/133.11, 423, 285/133.3, 133.4, 133.5, 179, 131.1, 132.1; 169/16, 37, 54, 5

(56) References Cited

U.S. PATENT DOCUMENTS

| 210,414 A | * 12/1878 | Enright ..................... 285/212 |
| 1,681,470 A | 8/1928 | Drees |
| 1,701,692 A | 2/1929 | Mueller |

(List continued on next page.)

FOREIGN PATENT DOCUMENTS

| AU | B-50697/90 | 10/1992 |
| DE | 2 246 496 | 5/1973 |
| EP | 0 643 116 A2 | 3/1995 |

OTHER PUBLICATIONS

Spears® Manufacturing Company, FlameGuard™ Fire Sprinkler Piping Products, Reinforced Sprinkler Head Cross FS–1B–0301 (Mar. 2001).
Spears® Manufacturing Company, FlameGuard™ Fire Sprinkler Piping Products, Reinforced Sprinkler Head Tee FS–1A–0301 (Oct. 2001).
Central Sprinkler Company Fire Protection Products Catalog, pp. 1, 2, 20, 21 and 24, (Apr., 2000), Central Sprinkler Company, Lansdale, PA 19446.
Central Price List BlazeMaster™, pp. E–1 through E–3, (Nov. 1, 1998), Central Sprinkler Company, Lansdale, PA 19446.

(List continued on next page.)

*Primary Examiner*—Lynne H. Browne
*Assistant Examiner*—Giovanna M Collins

(57) ABSTRACT

A fire sprinkler piping system fitting including a polymeric body having at least a first tubular branch, a second tubular branch, and a third tubular branch. Each of the first, second and third tubular branches extend outwardly from a common junction. The first and second tubular branches are collinear and the third tubular branch is generally perpendicular to the first and second tubular branches. Each of the first, second and third tubular branches have a distal end opposite from the common junction. The fitting includes pair of internally threaded metal inserts. Each insert is at least partially molded into the distal end of a separate one of a first and second tubular branches. Each of the internally threaded inserts has a distal outer surface facing generally away from the common junction. The distal outer surfaces of the pair of internal threaded metal inserts is spaced apart a distance of between three inches and four inches. The distal end of the third tubular branch has a smooth internal bore to slidingly receive a smooth outer end of a length of pipe.

40 Claims, 6 Drawing Sheets

U.S. PATENT DOCUMENTS

| | | | |
|---|---|---|---|
| 3,734,191 A | | 5/1973 | Johnson et al. |
| 3,976,314 A | * | 8/1976 | Graham .................... 285/238 |
| 4,412,898 A | | 11/1983 | Olson et al. ........... 204/159.18 |
| 4,790,573 A | | 12/1988 | Cardozo |
| 4,828,557 A | | 5/1989 | Persidsky |
| 4,888,148 A | | 12/1989 | Hartitz |
| 5,286,001 A | | 2/1994 | Rafeld |
| 5,366,257 A | * | 11/1994 | McPherson et al. ........ 285/174 |
| 5,437,481 A | | 8/1995 | Spears et al. |
| 5,716,077 A | | 2/1998 | Friedrich et al. |
| 5,769,128 A | | 6/1998 | Auvil et al. |
| 5,775,378 A | | 7/1998 | Auvil et al. |

OTHER PUBLICATIONS

Central Price List BlazeMaster™, CPVC Pipe & Fittings, pp. E–1 through E–2, (Jan. 3, 2000), Central Sprinkler Company, Lansdale, PA 19446.

Central Price List BlazeMaster™, CPVC Pipe & Fittings, pp. E–1 through E–2; (May 1, 2000), Central Sprinkler Company, Lansdale, PA 19446.

Central Price List BlazeMaster™, CPVC Pipe & Fittings, pp. E–1 through E–4, (Feb. 1, 2001), Central Sprinkler Company, Lansdale, PA 19446.

* cited by examiner

FIRE SPRINKLER PIPING SYSTEM FITTING

BACKGROUND OF THE INVENTION

The present invention is directed to a pipe fitting, and, more specifically, to a fire sprinkler piping system fitting.

Many buildings are required by code to have sprinklers at various locations in different rooms or areas. Compliance with such requirements can require an extensive amount of piping through various walls of the structure in order to provide the necessary water to the sprinklers. Conventionally, flow dividers are used to divide a supply of water into various secondary piping channels that guide the water to specific sprinkler heads.

What is needed, but so far not provided by the conventional art, is a fire sprinkler piping system fitting capable of supporting two sprinkler heads, each protruding into a separate room or area of a building, without requiring any additional piping between the fitting and the sprinkler heads.

SUMMARY OF THE INVENTION

The present invention is directed to a fire sprinkler piping system fitting including a polymeric body having at least a first tubular branch, a second tubular branch, and a third tubular branch. Each of the first, second and third tubular branches extend outwardly from a common junction. The first and second tubular branches are collinear and the third tubular branch is generally perpendicular to the first and second tubular branches. Each of the first, second and third tubular branches have a distal end opposite from the common junction. The fitting includes pair of internally threaded metal inserts. Each insert is at least partially molded into the distal end of a separate one of the first and second tubular branches. Each of the internally threaded inserts has a distal outer surface facing generally away from the common junction. The distal outer surfaces of the pair of internally threaded metal inserts is spaced apart a distance of between three inches and four inches. The distal end of the third tubular branch has a smooth internal bore to slidingly receive a smooth outer end of a length of pipe.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 4A is an enlarged view of the area labeled 4A in FIG. 4;

DETAILED DESCRIPTION OF THE INVENTION

Figure 1:
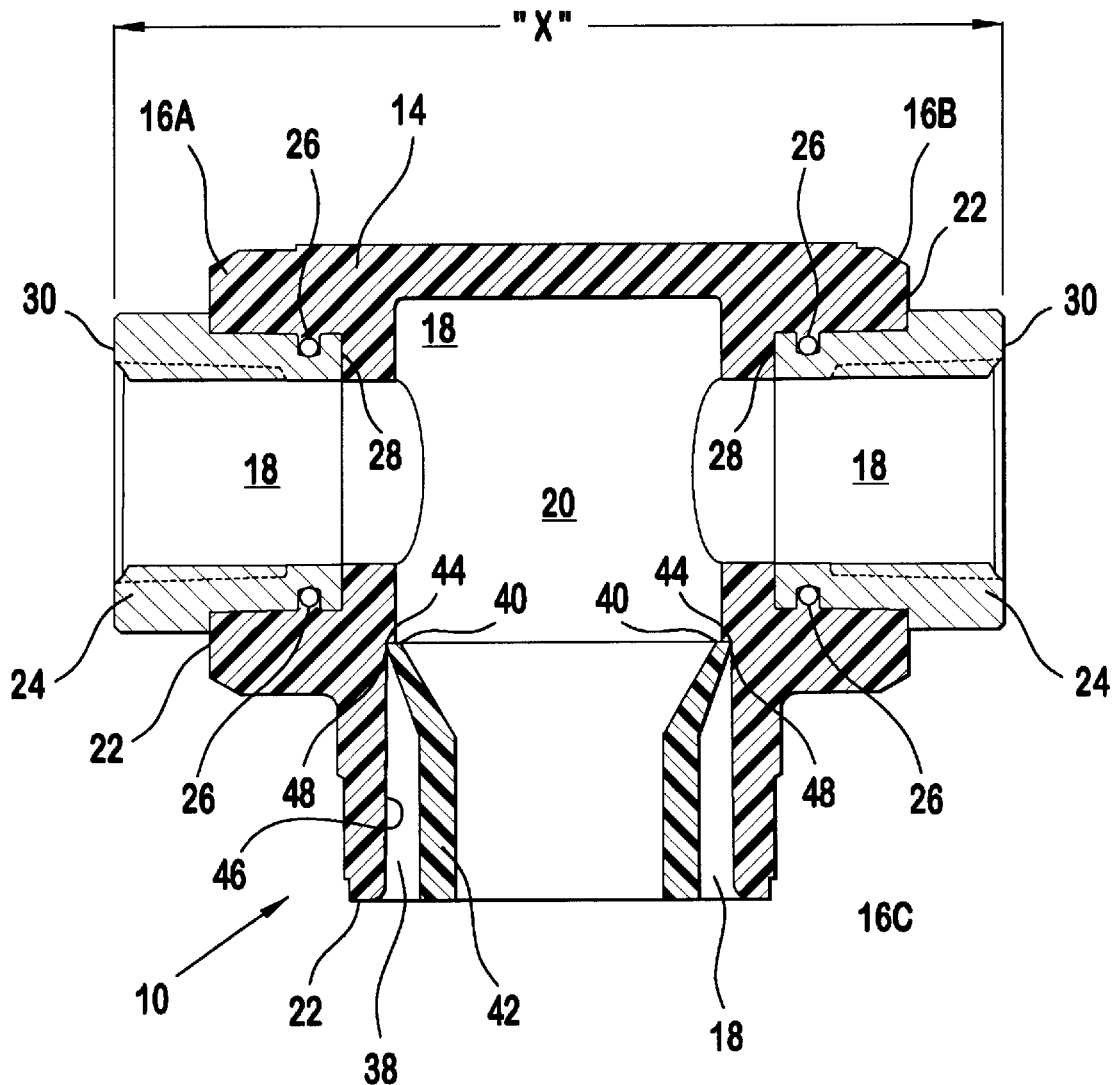
FIG. 1 is a cross-sectional view of a fire sprinkler piping system fitting according to the first embodiment of the present invention.
Figure 2:
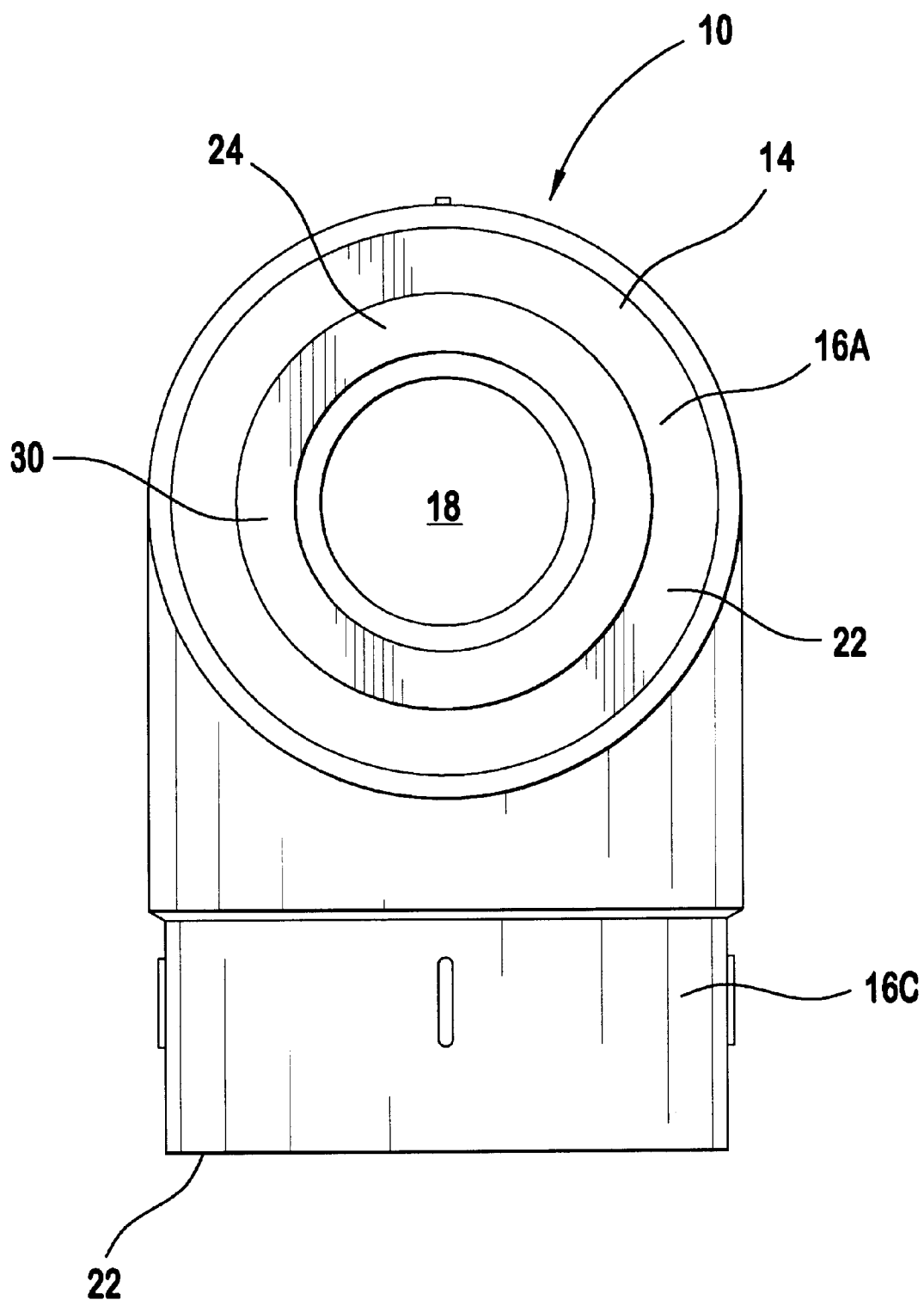
FIG. 2 is a left side elevational view of the fitting of FIG. 1.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the fire sprinkler piping system fitting and designated parts thereof. The words "radial" and "axial" refer to directions perpendicular to and along the central axis of an object, element or structure referred to or other designated axis. The terminology includes the words above specifically mentioned, derivatives thereof and words of similar import. The term "building" as used in the specification means "any one of a building, house, store, residence, apartment building, office, factory or the like." Additionally, the word "a," as used in the claims and in the corresponding portions of the specification, means "at least one."

Referring to the drawings in detail, wherein like numerals indicate like elements throughout, FIGS. 1–5 depict the first embodiment of a fire sprinkler piping system fitting, generally designated as 10. Briefly speaking, the fitting 10 allows two sprinkler heads 36 to be supplied fluid by a single pipe 42 while positioning the sprinklers so that they protrude from separate drywalls 34 into different areas of a building without requiring any additional piping between the fitting 10 and the sprinkler heads 36.

Figure 6:
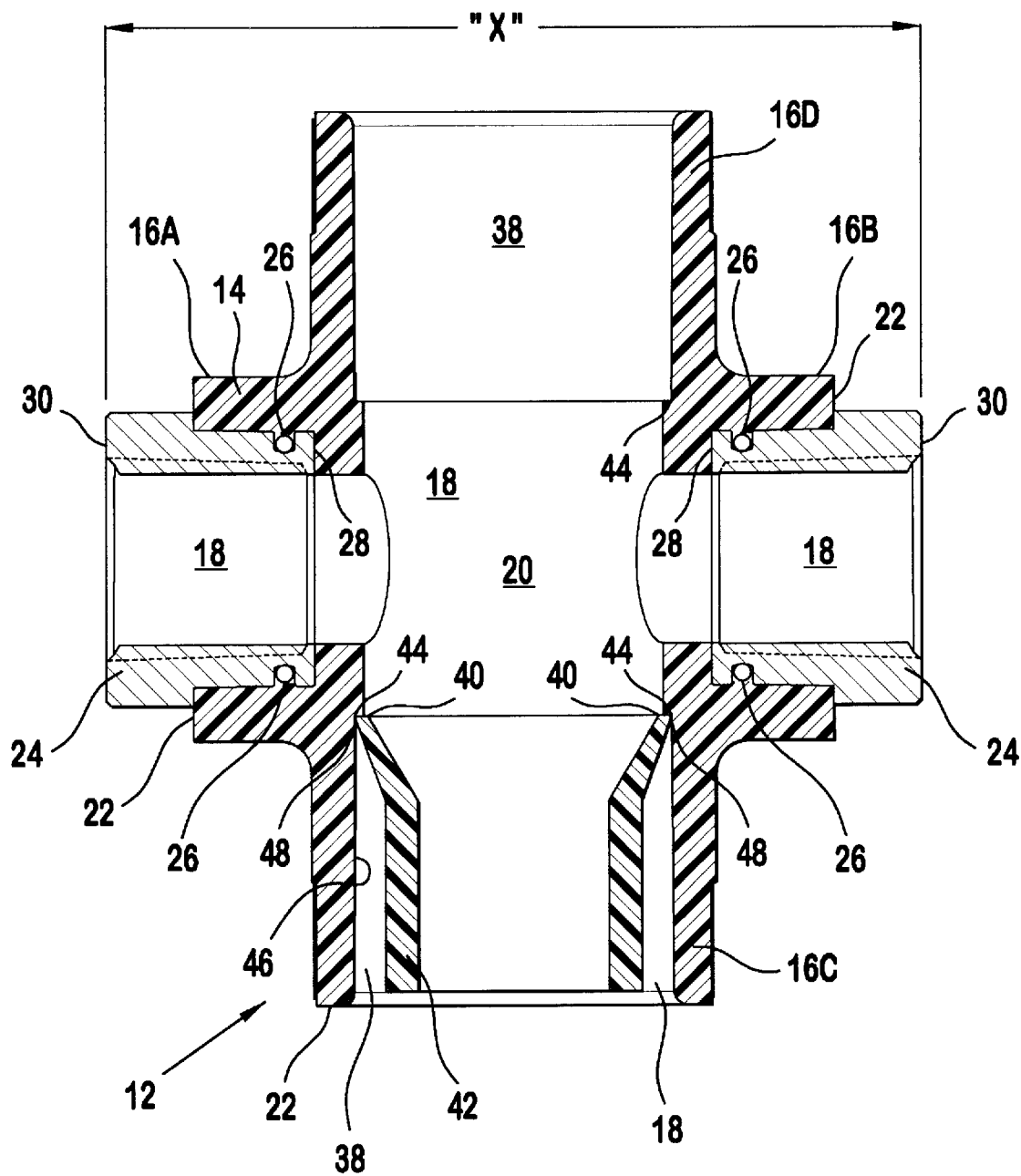
FIG. 6 is a cross-sectional view of a fire sprinkler piping system fitting according to a second embodiment of the present invention.

FIG. 6 depicts a second embodiment of a fire sprinkler piping system fitting, generally designated as 12. The fitting 12 is similar to the fitting of the first embodiment, except that a fourth tubular branch 16D (further described below) is provided to allow fluid to be transported past the sprinkler heads 36 to a location above the fitting 12. Since the fitting 10 of the first embodiment and the fitting 12 of the second embodiment are similar, except for the fourth tubular branch 16D, they will be jointly discussed below as appropriate.

Referring to FIGS. 1 and 6, the fittings 10, 12 of the present invention preferably include a polymeric body 14. The polymeric body 14 is preferably formed of chlorinated polyvinyl chloride ("CPVC") resin. The preferred type of CPVC resin for use with the present invention is sold under the BLAZEMASTER® brand name by the B. F. Goodrich Company. The use of CPVC, in particular, is preferred as only CPVC and polybutylene have passed industry standards for fire safety and thus are the only plastics that can be used currently for fire protection conduit systems. However, polybutylene systems have lower maximum ambient operating temperatures (120° F. versus 150° F. for CPVC), are more flexible than CPVC and require the provision of heat bonded mechanically crimped joints. Polybutylene heat bonded joints have been proven to be prone failure after extended thermal cycling. CPVC can be bonded directly to CPVC to form leak proof joints at ambient temperatures of from about zero (0°) degrees Fahrenheit to about one hundred (100°) degrees Fahrenheit or more with known, solvent based bonding agents. CPVC can be installed with fewer support hangers and in locations with higher ambient temperatures and with less structural protection than can polybutylene. Among plastics commonly molded or extruded, CPVC is one of the most difficult to work with. Extrusion temperatures for CPVC polymers range generally between four hundred (400° F.) degrees to about four hundred fifty (450° F.) degrees Fahrenheit. The B. F. Goodrich Company BLAZEMASTER® CPVC material has physical and thermal characteristics as follows:

| Property | | BLAZEMASTER ® Brand CPVC | ASTM |
|---|---|---|---|
| Specific Gravity | "Sp. Gr." | 1.55 | D792 |
| IZOD Impact Strength (ft. lbs./inch notched) | | 1.5 | D256A |
| Modulus of Elasticity, @ 73° F. psi | "E" | $4.23 \times 10^5$ | D638 |
| Compressive Strength, psi | "o" | 9,600 | D695 |
| Poisson's Ratio | "O" | .35–.38 | — |
| Working Stress @ 73° F. psi | "S" | 2,000 | D1598 |
| Hazen Williams Factor | "C" | 150 | — |
| Coefficient of Linear Expansion in/(in ° F.) | "e" | $3.4 \times 10^{-5}$ | D696 |
| Thermal Conductivity BTU/hr/ft²/° F./in | "k" | 0.95 | D177 |
| Flash Ignition Temperature | "° F." | 900 | D1929 |
| Limiting Oxygen Index | "LOI" | % 60 | D2863 |
| Electrical Conductivity | | Non Conductor | |
| Extrusion Temperature | (approx.) | 414–425° F. | N/A |
| Heat Distortion Temperature | "° F." | 217° F. | — |

Further information about CPVC resins used in BLAZEMASTER® CPVC material is provided in U.S. Pat. No. 4,412,898 which is hereby incorporated by reference herein in its entirety. Various piping systems are detailed in U.S. Pat. Nos. 5,769,128 and 5,775,378 both of which are hereby incorporated by reference herein in their entirety.

Figure 5:
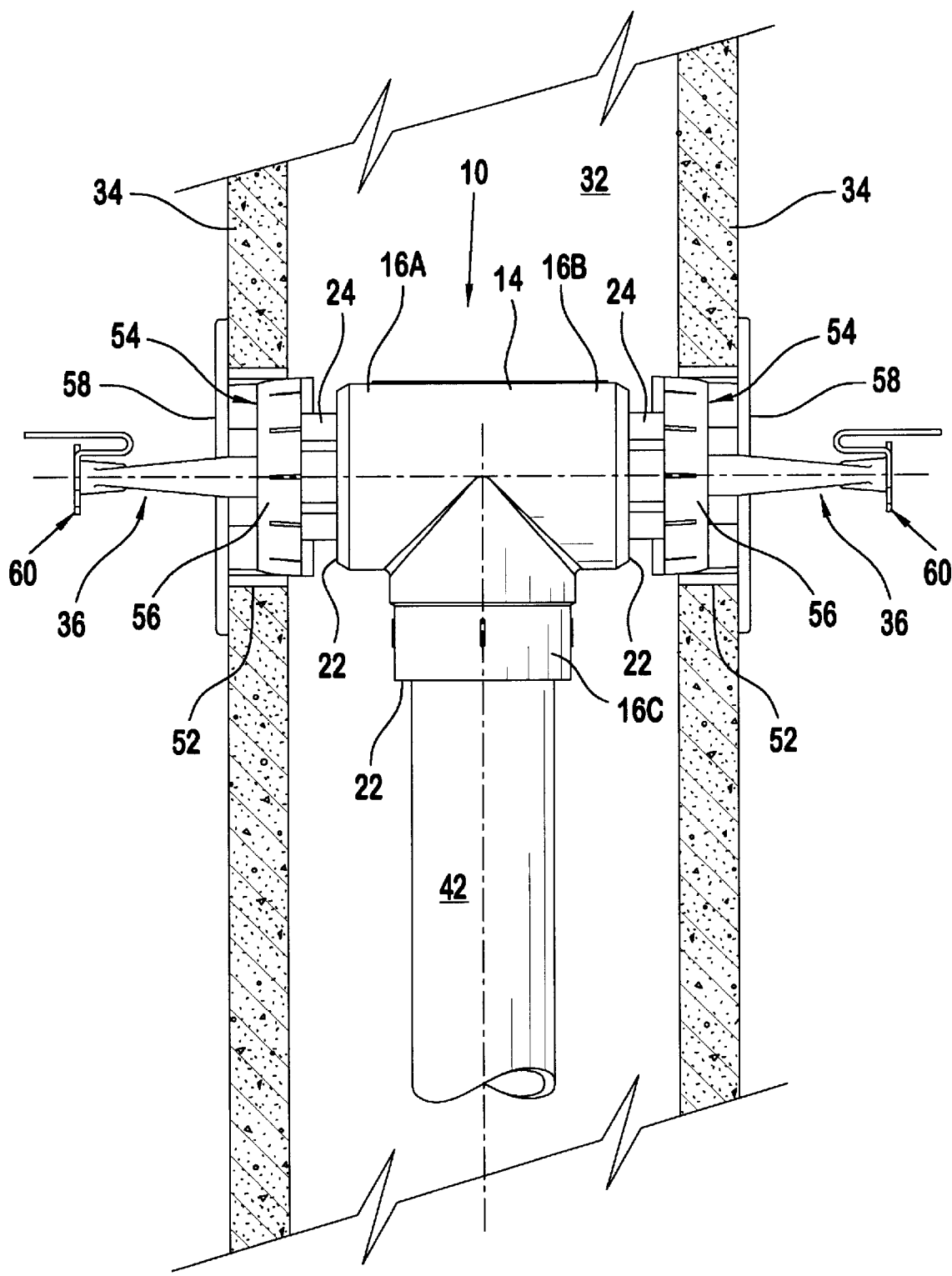
FIG. 5 is an enlarged view of the fitting of FIG. 1 installed in a structure similar to that shown in FIG. 4A.

Referring to FIGS. 1, 5 and 6, the fittings 10, 12 have at least a first tubular branch 16A, a second tubular branch 16B, and a third tubular branch 16C. Each of the tubular branches 16A–16C preferably has a generally cylindrical outer surface. However, those of ordinary skill in the art will appreciate from this disclosure that the outer surface of the tubular branches can have various shapes, such as a square or polygon, without departing from the scope of the present invention.

Each of the first through third tubular branches 16A–16C preferably has a hollow 18 which extends through the respective branch 16A–16C so that the first through third tubular branches 16A–16C are in fluid communication with each other. Each of the first, second and third tubular branches 16A–16C extend generally outwardly from a common junction 20. The first and second tubular branches 16A, 16B are generally collinear and a third tubular branch 16C is generally perpendicular to the first and second tubular branches 16A, 16B. Referring to FIG. 1, the first and second tubular branches 16A, 16B combine to extend laterally from the left side of the figure to the right side of the figure. The third tubular branch extends generally downwardly from the common junction 20 which is preferably symmetrically positioned with respect to the first and second branches 16A, 16B. Those of ordinary skill in the art will appreciate that the third tubular branch 16C can be askew from perpendicular to the first and second tubular branches 16A, 16B by up to about three (3°) degrees while still being generally perpendicular to the first and second tubular branches 16A, 16B.

Each of the first, second and third tubular branches has a distal end 22 opposite from the common junction 20. Thus, the distal ends of the first through third branches 16A–16C face generally leftwardly, rightwardly, and downwardly, respectively.

Referring to FIGS. 1–3 and 6, the fittings 10, 12 include a pair of internally threaded metal inserts 24. Each of the inserts 24 preferably has a generally annular shape with a passage therethrough to allow a sprinkler head 36 to be mounted inside of the insert as further described below. It is preferable, but not necessary, that the fittings 24 are formed of brass. The internal threads of the inserts 24 are preferably ½ inch—14 NPT threads. Each insert 24 is at least partially molded into the distal end 22 of a separate one of the first and second tubular branches 16A, 16B.

Each insert 24 preferably has a separate generally annular seal 26 disposed about an outer perimeter of the insert 24. The seal 26 preferably has a generally annular shape (not shown) and extends around the insert 24 proximate to an inner end 28 of the insert 24. The polymeric body 14 is molded over the seal 26 as well as at least a portion of the insert 24. It is preferable, but not necessary, that the pair of threaded metal inserts 24 each protrude from a distal end 22 of one of the first and second tubular branches 16A, 16B. It is preferred, but not necessary, that the threaded metal inserts 24 protrude by from their respective branches 16A, 16B by up to one half (½") of an inch.

Each of the pair of internally threaded inserts 24 has a distal outer surface 30 facing generally away from the common junction 20. As best shown in FIGS. 1 and 6, the distal outer surfaces 30 of the pair of internally threaded inserts 24 are on the leftmost and rightmost portions of the fittings 10, 12. The outer surfaces 30 of the inserts 24 of the first and second branches 16A, 16B are preferably spaced apart a distance "X" of between three (3") inches and four (4") inches.

Referring to FIGS. 4A and 5, the distance "X" between the outer surfaces 30 of the inserts 24 allows the fittings 10, 12 to be mounted on a two by four (2×4) member 32 with one insert 24 disposed at least partially through each adjoining drywall 34. Thus, the configuration of the fittings 10, 12 allows for a single fitting 10, 12 to support sprinkler heads 36 in two separate locations, or areas, in a building without requiring any additional piping between the fittings 10, 12 and the sprinkler heads 36. The design of the fittings 10, 12 reduces the expense associated with installing sprinkler heads 36 and simplifies the installation of sprinkler heads 36 in a building.

It is preferred, but not necessary, that the distance "X" between the distal outer surfaces 36 of the pair of internally threaded metal inserts 24 is between three and one quarter (3¼") inches and three and three quarter (3¾") inches. The most preferred distance "X" depends on whether the fittings 10, 12 are used with one half (½") inch drywalls or with five eighths (⅝") inch drywalls. When mounting the fittings 10, 12 on a 2×4 member 32 in a building using half (½") inch drywalls, it is preferred, but not necessary, that the distance "X" between the distal outer surfaces 30 of the pair of inserts 24 is approximately three and three eighths (3⅜") inches. When mounting the fittings 10, 12 on a two by four (2×4) member 32 in a building using five eighths (⅝") inch drywalls, it is preferable, but not necessary, that the distance "X" between the distal outer surfaces 30 of the inserts 24 is approximately three and five eighths (3⅝") inches.

Figure 3:
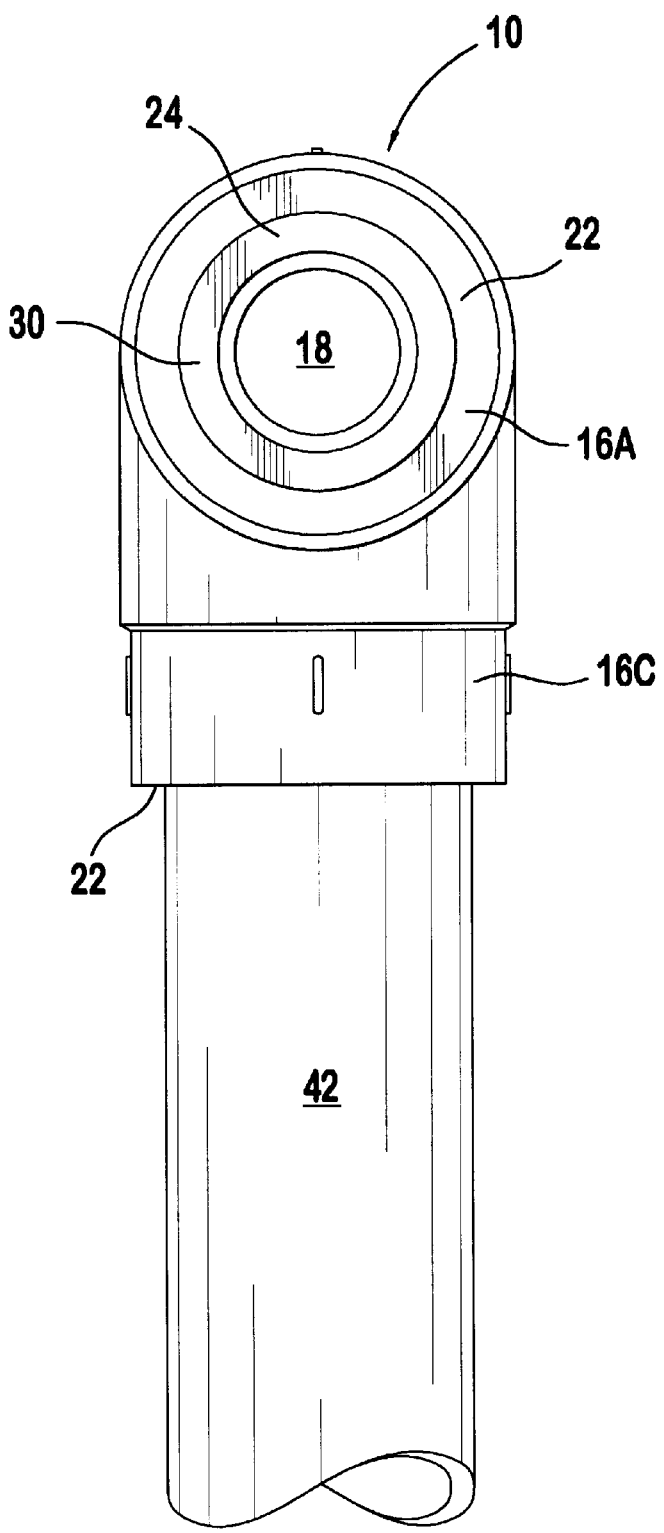
FIG. 3 is a left side elevational view of the fitting of FIG. 1 positioned over an end of a length of pipe.
Figure 4:
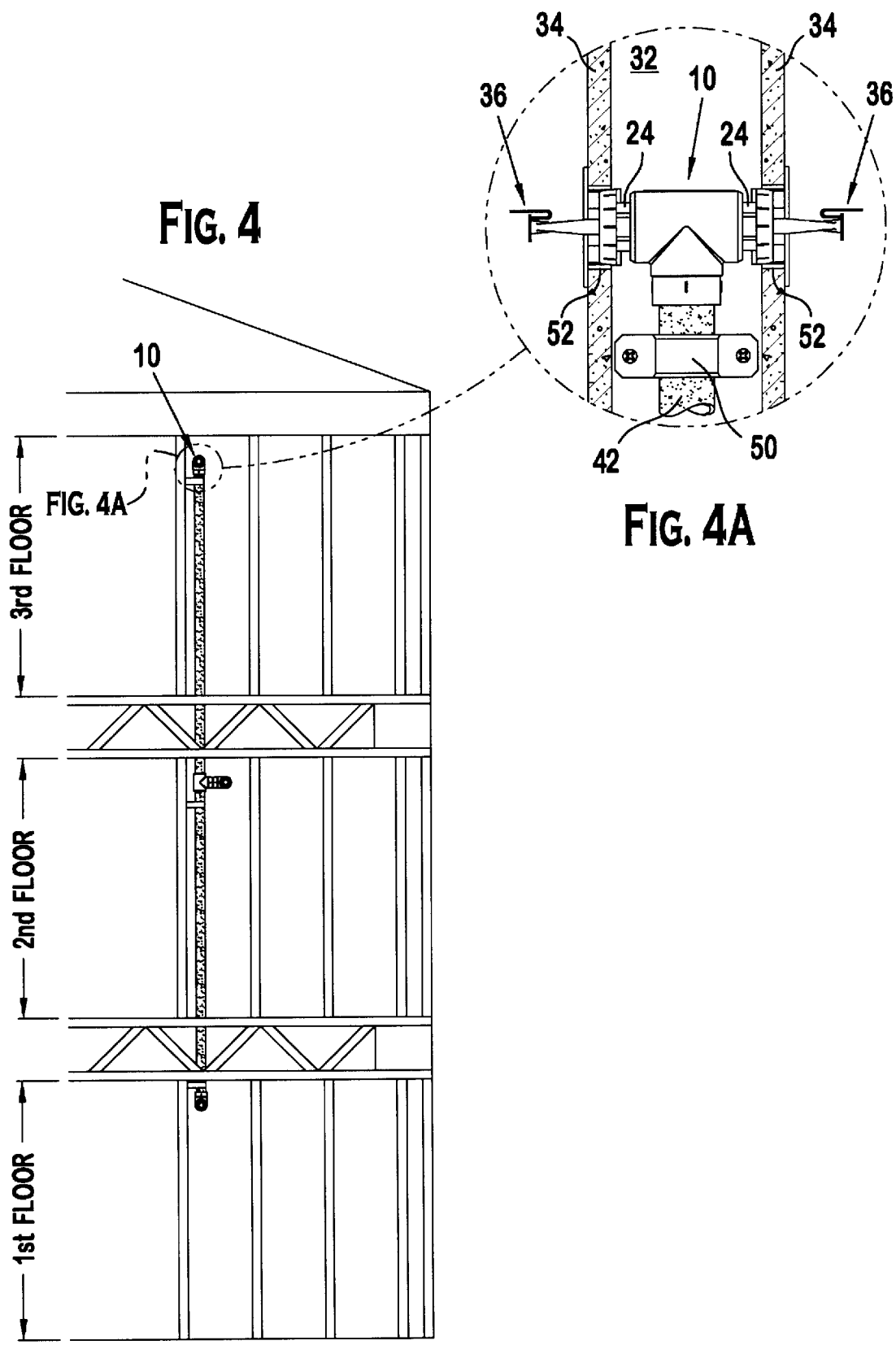
FIG. 4 is a schematic diagram illustrating the integration of the fitting of FIG. 1 into the structure of a building.

Referring to FIGS. 1, 3 and 6, the distal end 22 of the third tubular branch 16C has a smooth internal bore 38 to slidingly receive a smooth outer end 40 of a length of pipe 42. The use of the term "smooth" to describe the outer end 40 of the length of pipe 42 refers to the lack of threads or protuberances on the outer end 40 that would prevent a liquid tight seal from being formed between the length the pipe 42 and the third branch 16C of one of the fittings 10, 12.

It is preferred, but not necessary, that the third tubular branch 16C has a shoulder 44 extending generally radially inwardly from an inner surface 46 of the smooth internal bore 38 to abut a transverse end surface 48 of the smooth outer end 40 of the length of pipe 42. The shoulder 24 is preferably positioned proximate to the common junction 20 and extends around the inner diameter of the internal bore 38 of the third branch 16C.

Referring to FIG. 6, it is preferred that the second embodiment of the fitting 12 have a fourth tubular branch 16D extending from the common junction 20 so that the fourth tubular branch 16D is collinear with the third tubular branch 16C. The fourth tubular branch 16D preferably has a smooth internal bore 38 to slidingly receive the smooth outer end of a length of pipe (not shown). The fourth tubular branch 16D preferably has a shoulder 44 extending generally inwardly from an inner surface of the smooth internal bore 38 to abut a transverse end surface of the smooth outer end of the length of pipe (not shown). The position and shape of the shoulder 44 in the fourth branch 16D is similar to that of the shoulder 44 in the third branch 16C. The second embodiment of the fitting 12 of the present invention can be used to support two (2) sprinkler heads in a fashion similar to that shown in FIG. 5. Additionally, the fitting 12 of the second embodiment is designed to also transfer fluid past the inserts 24 so that additional sprinkler piping can extend above the fitting 12.

Referring to FIGS. 1–5, the fitting 10 of the first embodiment of the present invention operates as follows. The polymeric body 14 is positioned over an outer end 40 of a length of pipe 42. The outer end 40 of the length of pipe 42 abuts a shoulder 44 positioned within the third tubular branch 30C of the fitting 10. As best shown in FIG. 4A, the length of pipe 42 is secured to a 2×4 member 32 using a pipe strap 50. The pipe strap 50 supports the pipe 42 spaced apart from the 2×4 member to accommodate the slightly larger width of the fitting 10 relative to the pipe 42 (as shown in FIG. 3). With the position of the pipe 42, as well as the fitting 10, preferably secured by the pipe strap 50, the inserts 24 of the fitting 10 are aligned with and preferably extend partially through holes 52 in the drywalls 34.

The sprinkler heads 36, in combination with a ring 56, forms a sprinkler frame 54. The sprinkler heads 36 also include deflectors 60. To assemble the sprinkler frame 54, the ring 56 is threadably secured over the threaded end (not shown) of the sprinkler head 36. Then, the threaded end of the sprinkler head 36 is threadably engaged with the internal threads of the inserts 24 by screwing the threaded end of the sprinkler heads into the inside of one of the inserts 24. The circumference of the ring 56 is flared outwardly as one moves along the outer surface of the ring 56 toward the common junction 20 of the fitting 10. The flaring of the ring 56 allows a face plate 58 (further described below) to be secured over the ring 56. The fitting 10 preferably provides all of the vertical support for the sprinkler heads 36 which are preferably not vertically supported by the drywalls 34. After the sprinkler heads 36 are attached to the fitting 10, the faceplate 58 is positioned over the ring 56 to cover the hole 52 in the drywall 34.

The faceplates 58 preferably have a generally circular shape when viewed along a longitudinal axis of the first or second branch 16A, 16B of the fitting 10. A cylindrical protuberance extends from the side of the faceplate 58 that is adjacent to the hole 52 to engage the ring 56. The flaring of the ring 56 causes the protuberance of the faceplate 58 to engage the ring 56 with a firm friction interference fit. A hole is generally centrally positioned through the faceplates 58 to allow the sprinkler heads 36 to extend through the faceplate 58 while increasing the esthetic appeal of the installed sprinkler heads 36.

Once the fitting is installed, fluid (preferably water) can be supplied to the sprinkler heads 36 by driving water generally upwardly through the length of pipe 42. Pressure is used to drive the water through the pipe 42 and into the third tubular branch 16C of the fitting 10. The water is then conveyed to the common junction 20 where the water is guided, via the first and second tubular branches 16A, 16B, to the sprinkler heads 36 that are attached to the fitting 10. As the fitting 10 is preferably attachable directly to a supply pipe 42 and directly to two sprinkler heads without requiring any additional piping between the fitting 10 and the sprinkler heads 36, the fitting 10 allows for simpler and less expensive installation of a sprinkler system in a building.

Referring to FIG. 6, the second embodiment of the fitting 12 is installed and operates similarly to the above described fitting 10 of the first embodiment of the present invention except for the fitting 12 of the second embodiment of the present invention includes a fourth tubular branch 16D. The fourth tubular branch 16D allows a length of pipe (not shown) to extend above the fitting 12 to convey fluid to the remainder of the sprinkler system (not shown) that is positioned above the fitting 12. Thus, by using a combination of the fittings 10, 12 of the present invention, multiple sprinkler heads can be supported along various vertical positions throughout a building.

It is recognized by those of ordinary skill in the art, that changes may be made to the above-described embodiments of the invention without departing from the broad inventive concept thereof. It is understood, therefore, that this invention is not limited to the particular embodiments disclosed, but it is intended to cover all modifications which are within the spirit and scope of the invention as defined by the appended claims.

What is claimed is:

1. A fire sprinkler piping system fitting, comprising:

a polymeric body having at least a first tubular branch, a second tubular branch, and a third tubular branch, each of the first, second and third tubular branches extending outwardly from a common junction, the first and second tubular branches being collinear and the third tubular branch being generally perpendicular to the first and second tubular branches, each of the first, second and third tubular branches having a distal end opposite from the common junction;

a pair of internally threaded metal inserts, each insert being at least partially molded into the distal end of a separate one of the first and second tubular branches, each of the pair of internally threaded metal inserts having a distal outer surface facing generally away from the common junction, the distal outer surfaces of the pair of internally threaded metal inserts being spaced apart a distance of between three inches and four inches along an axis and adapted to retain respective fire sprinklers at distal ends of the body along the axis so that when the body is disposed between spaced walls, a deflector of each respective sprinklers projects from a surface of each of the walls opposite a wall surface exposed to the body; and the distal end of the third tubular branch having a smooth internal bore to slidingly receive a smooth outer end of a length of pipe.

2. The fitting of claim 1 further comprising a fourth tubular branch extending from the common junction so that the fourth tubular branch is collinear with the third tubular branch, the fourth tubular branch having a smooth internal bore to slidingly receive a smooth outer end of a length of pipe.

3. The fitting of claim 1 wherein the distance between the distal outer surfaces of the pair of internally threaded metal inserts is between three and one quarter inches and three and three-quarter inches.

4. The fitting of claim 3 wherein the distance between the distal outer surfaces of the pair of internally threaded metal inserts is approximately three and three-eighths inches.

5. The fitting of claim 3 wherein the distance between the distal outer surfaces of the pair of internally threaded metal inserts is approximately three and five-eighths inches.

6. The fitting of claim 1 wherein the third tubular branch has a shoulder extending generally radially inwardly from an inner surface of the smooth internal bore to abut a transverse end surface of the smooth outer end of the length of pipe.

7. The fitting of claim 2 wherein the fourth tubular branch has a shoulder extending generally inwardly from an inner surface of the smooth internal bore to abut a transverse end surface of the smooth outer end of the length of pipe.

8. The fitting of claim 1 wherein the pair of internally threaded metal inserts each protrude from the distal end of one of the first and second tubular branches.

9. The fitting of claim 8 wherein the distal ends of the threaded metal inserts protrude up to one-half inch.

10. The fitting of claim 1, wherein the polymeric body is formed of chlorinated polyvinyl chloride resin.

11. The fitting of claim 10 wherein the chlorinated polyvinyl chloride resin has an extrusion temperature of between four hundred fourteen (414°) degrees Fahrenheit and four hundred twenty five (425°) degrees Fahrenheit.

12. The fitting of claim 10 wherein the pair of internally threaded metal inserts are formed of brass.

13. The fitting of claim 1, wherein the polymeric body comprises polybutylene.

14. A fire sprinkler piping system fitting, comprising:
 a polymeric body extending along an axis, the body having first and second branches disposed along the axis, the distal ends of the first and second branches having a pair of internally threaded portions being spaced apart along the axis between three and four inches and adapted to receive respective sprinklers disposed generally on the axis so that when the body is disposed between spaced walls, a deflector of each sprinkler projects from a respective surface of the spaced walls opposite a wall surface exposed to the body, and a third branch extending generally perpendicular to the axis, the third branch having an internal bore to receive an outer end of a length of pipe.

15. The sprinkler fitting of claim 14, wherein the pair of threaded portions further comprise metallic annular inserts being provided with pipe threads formed on each insert.

16. The sprinkler fitting of claim 14, wherein the threaded portions further comprise ½ inch—14 NPT threads.

17. The sprinkler fitting of claim 16, wherein the distance between threaded portions comprises a distance of approximately 3⅝ inches.

18. The sprinkler fitting of claim 14, wherein the internal bore of the body is adapted to be coupled to a fluid supply pipe.

19. The sprinkler fitting of claim 14, wherein the bore portion includes an annular shoulder located within the bore portion.

20. The sprinkler fitting of claim 14, wherein the body further comprises a fourth branch extending in a direction collinear with the third branch, the fourth branch having an internal bore to slidingly receive an outer end of a length of pipe.

21. The sprinkler fitting of claim 20, wherein the body further comprises a generally smooth internal bore extending from distal ends of the third and fourth branches with annular shoulder bore portions disposed in the smooth internal bore, the smooth internal bore having a larger opening than the annular shoulder bore portions.

22. The sprinkler fitting of claim 14, wherein the polymeric body comprises one of chlorinated polyvinyl chloride and ploybutylene.

23. A sprinkler assembly adapted to be coupled to a fluid supply, the assembly comprising:
 a fitting having a polymeric body extending along an axis, the polymeric body including first, second and third bores, the first and second bores extending generally along the axis and the third bore extending generally perpendicular to the axis, the distal ends of the first and second bores being spaced at a distance between three and four inches and having respective internally threaded portions; and
 a pair of sprinklers, each sprinkler having a frame, a deflector, and an end being coupled to a respective one of the threaded portions, the frames being disposed generally along the axis so that when the polymeric body is disposed between spaced walls, the deflectors of the sprinklers projecting from respective wall surfaces of the spaced walls that are opposite wall surfaces exposed to the body.

24. The sprinkler assembly of claim 23, wherein the threaded portions further comprise metallic annular inserts being molded to a respective one of the first and second bores of the polymeric body.

25. The sprinkler assembly of claim 23, wherein the polymeric body comprises one of chlorinated polyvinyl chloride and ploybutylene.

26. The sprinkler assembly of claim 23, wherein the fitting further comprises a fourth bore extending in a direction collinear with the third bore he fourth bore having an internal bore to receive an outer end of a length of pipe.

27. The sprinkler assembly of claim 23, wherein the internally threaded portions comprise approximately ½ inch—14 NPT threads.

28. The sprinkler assembly of claim 24, wherein the spaced walls comprise confronting wall surfaces spaced apart by a two-by-four member.

29. A fire protection system for a building, the system comprising:
 a supply pipe;
 at least one sprinkler fitting being coupled to the supply pipe, the at least one sprinkler fitting including:
  a polymeric body; and
  a distal pair of internally threaded portions having terminal ends being spaced apart at a distance of three to four inches on a common axis; and
 at least a pair of sprinklers, the sprinklers having respective frames and deflectors, the frames being disposed generally along the common axis so that when the polymeric body is disposed between spaced walls, the deflectors of the sprinklers project from respective wall surfaces of the spaced walls that are opposite wall surfaces exposed to the body.

30. The system of claim 29, wherein the threaded portions further comprise respective metallic annular inserts being molded to the polymeric body.

31. The system of claim 30, wherein the pair of internally threaded portions comprise brass.

32. The system of claim 29, wherein the polymeric body comprises one of chlorinated polyvinyl chloride and ploybutylene.

33. The system of claim 29, wherein the fitting further comprises:
- a supply opening and having a bore being coupled to the supply pipe and extending generally perpendicular to the common axis; and
- a pipe opening extending in a direction collinear with the supply opening, the pipe opening having an internal bore to receive an outer end of a length of a pipe.

34. The system of claim 29, wherein outer surfaces of the pair of internally threaded portion being spaced apart a distance of approximately 3⅝ inches.

35. The system of claim 29, wherein each of the spaced walls is adjacent an area to be protected.

36. The system of claim 33, further comprising a plurality of straps securing at least one of the supply pipe and the pipe to at least one member being located between spaced walls and orthogonal to a plane defined by at least one of the walls.

37. The system of claim 36, wherein one of the supply pipe and the pipe extends generally perpendicular to the common axis and between a plurality of floors of the building.

38. A method of fire protection for two adjacent areas to be protected that are separated by a common divider, the common divider including two spaced walls, the method comprising:
- locating a common supply pipe between spaced walls of the adjacent areas to be protected; and
- connecting the two sprinklers via one fitting to the common supply pipe so that the two sprinklers are spaced apart on an axis and project away from a respective one of the spaced walls.

39. The method of claim 38, wherein the connecting further comprises locating respective portions of the sprinklers on the fitting with terminal branch ends generally on the axis at a distance of between three and four inches.

40. The method of claim 39, wherein the supplying further comprises securing the common supply pipe to a support member that extends generally perpendicular to and intersecting the axis.

* * * * *